United States Patent [19]
Bhat et al.

[11] Patent Number: 5,539,803
[45] Date of Patent: Jul. 23, 1996

[54] WIRELESS TEST MODE FOR A CORDLESS TELEPHONE

[75] Inventors: Ghanshyam A. Bhat, Holmdel; Arthur F. Corvo, Middletown; Gerard W. Elson, Basking Ridge; Donato J. Forlenzo, Manahawkin, all of N.J.; Douglas P. Greeley, Littleton, Colo.; Richard Y. Hsia, Holmdel, N.J.; Vandy W. Lee; Frank W. Lescinsky, both of Middletown, N.J.; Thorp Rivingston, Red Bank, N.J.; Donald J. Weber, Shrewsbury, N.J.

[73] Assignee: AT&T Corp., Murray Hill, N.J.

[21] Appl. No.: 304,026

[22] Filed: Sep. 9, 1994

[51] Int. Cl.⁶ .......................... H04M 1/24; H04M 11/00; H04Q 7/00; H04B 17/00
[52] U.S. Cl. .................. 375/21; 379/27; 379/61; 455/34.1; 455/67.1
[58] Field of Search .................. 379/1, 21, 27, 379/29, 32, 34, 22, 58, 61; 455/34.1, 67.1

[56] References Cited

U.S. PATENT DOCUMENTS

| | | | |
|---|---|---|---|
| 4,554,410 | 11/1955 | Furumoto | 379/61 |
| 5,297,203 | 3/1994 | Rose et al. | 379/61 X |
| 5,323,447 | 6/1994 | Gillis et al. | 379/61 |
| 5,343,509 | 8/1994 | Dounies | 379/58 X |
| 5,352,341 | 10/1994 | Gillis et al. | 375/61 |

*Primary Examiner*—Stephen Chin
*Assistant Examiner*—Paul Loomis
*Attorney, Agent, or Firm*—Samuel R. Williamson

[57] ABSTRACT

A cordless telephone set advantageously includes a wireless test mode accessible by a user for evaluating performance levels of operating parameters in the cordless telephone set in diverse geographical locations. When configured in a normal operating mode, the cordless telephone set provides normal wireless communications. When configured in the wireless test mode, the cordless telephone set provides audible and visual input to its user for use in determining a maximum acceptable separation distance for satisfactory communications between a telephone handset unit and its associated base unit in the cordless telephone set. This operating range determination for the cordless telephone set is achieved by providing a simulation of a recognizable tone, such as dial tone, to which a user subjectively listens while testing an application environment. At the same time, statistical readings of signal strength and voice quality also are provided in a display on the telephone handset unit while in this wireless test mode. The simulated tone and the statistical readings allow the user to quickly and easily correlate effective, usable operating range for the cordless telephone set.

29 Claims, 6 Drawing Sheets

BASE 10

HANDSET 20

FIG. 7

| | SIGNAL STRENGTH | | VOICE QUALITY |
|---|---|---|---|
| DISPLAY NUMBER | EXPLANATION | DISPLAY NUMBER | EXPLANATION |
| 10 | STRONG/ALMOST ERROR FREE | 10 | VERY GOOD |
| 9 | STRONG/ALMOST ERROR FREE | 9 | VERY GOOD |
| 8 | STRONG/ALMOST ERROR FREE | 8 | ERRORS, BUT NOT NOTICEABLE IN NORMAL SPEECH |
| 7 | VERY GOOD/SOME ERRORS | 7 | ERRORS, BUT NOT NOTICEABLE IN NORMAL SPEECH |
| 6 | VERY GOOD/SOME ERROR | 6 | NOTICEABLE NOISE |
| 5 | GOOD/MORE ERRORS | 5 | NOTICEABLE NOISE |
| 4 | GOOD/FAIR MORE ERRORS | 4 | NOISY BUT INTELLIGIBLE SPEECH |
| 3 | FAIR MORE ERRORS | 3 | NOISY BUT INTELLIGIBLE SPEECH |
| 2 | NEAR END OF RANGE | 2 | GARBLED SPEECH |
| 1 | NEAR END OF RANGE - LOSS OF LINK | 1 | UNINTELLIGIBLE SPEECH |
| 0 | LOSS OF LINK | 0 | LOSS OF LINK |

WIRELESS TEST MODE FOR A CORDLESS TELEPHONE

BACKGROUND OF THE INVENTION

1. Technical Field

This invention relates to cordless telephone sets and, more particularly, to a cordless telephone set usable in evaluating performance levels of operating parameters of such set in diverse geographical locations.

2. Description of the Prior Art

Cordless telephone sets have now become as commonplace as corded telephone sets in many homes. Indeed, recent sales figures reflect that more cordless telephone sets than corded telephone sets are presently being sold for home use. Customers having experienced cordless telephone sets in the home environment now desire the mobility and freedom provided by these sets in the business environment. These same customers, however, have stricter needs for the business environment. Typically, they require that the business cordless telephone sets have greater range and higher voice quality to serve their business applications. Before purchasing such a set, therefore, business customers feel the need to be reassured that the cordless telephone set being purchased meets 1) the range and 2) the voice quality that they have become accustomed to with comparable corded telephone sets in the business environment.

Thus, to fulfill the need for a "try it before you buy it" mentality, an account executive typically visits a potential business customer's site location with a "black box" cordless telephone set. This set is then operated at different locations around the site for insuring that both the operating range and voice quality of a subsequently provided cordless telephone set will be satisfactory for the customer's application. Because the "black box" cordless telephone set is not the actual cordless telephone set that the customer receives, the operating range and voice quality parameters may differ, or may be perceived by the customer to differ, from those obtained from the subsequently provided cordless telephone set. Such a change in performance or its perception may easily lead to customer dissatisfaction with the cordless telephone set.

Cordless telephone sets in a business environment are often installed in a private branch exchange (PBX) communication system where a number of signal lines are provided between a group of local users and a host switch within the PBX communication system. Thus a cordless telephone set having access to the switch is typically connected by signal lines, such as wire or optical fiber, to the switch for accessing other local users and also for accessing a remote communications exchange. One of the continuing problems experienced by business customers is being able to accurately determine a source of operating difficulty within a PBX communication system which has a switch and many different components, i.e, corded telephone sets, facsimile machines, answering machines, etc., respectively connected through local loops to this switch. Unfortunately, when some type of operating difficulty is encountered in a communication system and a cordless telephone set is a part of this system, more often than not, the cordless telephone set is believed to be the source of the operating difficulty. Often the source of operating difficulty, however, is found in another part of the communications system. Thus, if a source of operating difficulty is not easily and accurately determined, expensive and unnecessary repair costs may be incurred by the customer.

It is therefore desirable to be able to demonstrate to a potential business customer expected performance levels for parameters such as operating range and voice quality for a cordless telephone set to be acquired by the customer for use at a site location. It is also desirable to enable the customer to subsequently check these parameters for determining if the cordless telephone set is operating at its previously determined performance levels thereby avoiding unnecessary repair calls for the cordless telephone set in the communication system.

SUMMARY OF THE INVENTION

In accordance with the invention, the above problems are solved through the use of a cordless telephone set which advantageously includes a wireless test mode accessible by, for example, either a salesperson, service technician or a customer for evaluating the performance levels of operating parameters in the cordless telephone set. In a normal operating mode, the cordless telephone set provides wireless telephone communications for a customer.

In accordance with an aspect of the invention, the cordless telephone, while in the wireless test mode, provides input to the user for such parameters as its usable operating range at the customer's site location and if its voice quality meets the customer's expectations. The cordless telephone also, while in the wireless test mode, is advantageously usable by the service technician or customer to assist in isolating problems in an associated communications system by enabling the customer to check at any time the performance level for parameters for the cordless telephone set.

BRIEF DESCRIPTION OF THE DRAWINGS

The invention and its mode of operation will be more clearly understood from the following detailed description when read with the appended drawing in which:

FIG. 7 is a table showing values that are used in communicating the performance levels of operating parameters of the cordless telephone set, in accordance with the principles of the present invention.

Throughout the drawing, the same element when shown in more that one figure is designated by the same reference numeral.

DETAILED DESCRIPTION

Figure 1:
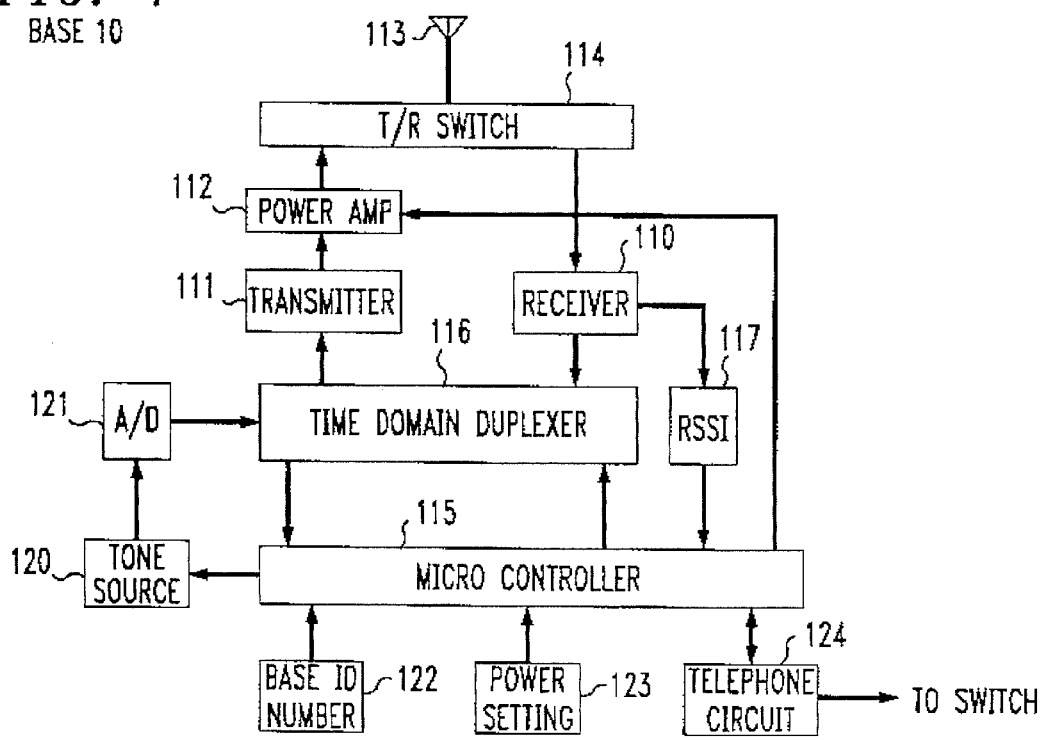
FIG. 1 shows a general block diagram of certain circuitry of a base unit of a cordless telephone set operative in accordance with the principles of the present invention.

Referring now to FIG. 1 of the drawings, there is shown a general block diagram of certain circuitry of a base unit 10 of a cordless telephone set. This base unit along with the handset unit 20, shown in FIG. 2 and described with reference to this figure, comprise the cordless telephone set.

The base unit 10 connects to a host switch such as contained in a "DEFINITY®" communications system, a "MERLIN®" communications system or a "PARTNER®" communications system for providing an interconnection for the telephone handset unit 20 to this switch.

In a normal operating mode, the cordless telephone set is configured for providing wireless telephone communication between the host switch and the handset unit via the base unit. The cordless telephone set is also configurable in a wireless test mode. In this mode, performance levels for parameters such as operating range and voice quality for the cordless telephone set may be monitored. These parameters are of particular interest to a potential customer considering acquiring a cordless telephone set for use at his or her site location. In the wireless test mode, an account executive or salesperson may directly demonstrate the performance levels of these parameters of the cordless telephone set at the site location.

In determining a usable operating range, for example, the cordless telephone set while in the wireless test mode provides a simulation of a recognizable tone, such as dial tone. The customer subjectively listens to this tone while he or she, for example, walk-tests an application environment. At the same time, statistical readings of signal strength and voice quality are also available from the handset unit while the cordless telephone set is in this mode. The statistical readings and the simulated tone allow the customer to correlate effective, usable operating range for the handset unit of the cordless telephone set. If the customer is satisfied with the observed operating range, the salesperson or account executive is able to leave the cordless telephone set used in this demonstration with the customer. By so doing, the customer is comfortable in the knowledge that the cordless telephone set which he or she receives will operate at a certain demonstrated performance level.

The wireless test mode is easily accessible by the customer. The customer is thus able to subsequently check the parameters for determining if the cordless telephone set is operating at its previously determined performance level thereby avoiding unnecessary repair calls for the cordless telephone set in the communication system.

Both the base unit 10 and the handset unit 20, as shown, are operable over a plurality of communication channels in a frequency hopping system. A general overview of spread spectrum technology including frequency hopping systems is provided by R. C. Dixon, *Spread Spectrum Systems*, New York: John Wiley & Sons, 1984. According to Dixon, a frequency hopping system or "frequency hopper" consists basically of a code generator and a frequency synthesizer capable of responding to the coded output from the code generator. Also, according to Dixon, "Frequency hopping" modulation is more accurately termed "multiple-frequency, code-selected, frequency shift keying." It is simply FSK (frequency shift keying) except that the set of frequency choices is greatly expanded. Simple FSK most often uses only two frequencies; for example f1 is sent to signify a "mark," f2 to signify a "space." Frequency "hoppers," on the other hand, often have thousands of frequencies available. One system described by L. M. Goodman et al. in *The TATS Master-A Net Controller for Tactical Satellite Communications*, has $2^{20}$ discrete frequency choices, randomly chosen, each selected on the basis of a code in combination with the information transmitted. The number of frequency choices and the rate of hopping from frequency to frequency in any frequency hopper is governed by the requirements placed on it for a particular use. The specific requirements for the frequency hopping system in which this cordless telephone set is designed to operate are set forth in a Report and Order in General Docket No. 89-354, this Report and Order being adopted by the Federal Communications Commission on Jun. 14, 1990 and released on Jul. 9, 1990.

Cordless telephone sets designed to operate in a frequency hopping system have now become available. One example of such a cordless telephone set has been designed in accordance with the teachings of U.S. Pat. No. 5,323,447 and with U.S. Pat. No. 8,353,341 issued on Oct. 4, 1994. Such cordless telephone set is usable for incorporating the inventive aspects of the embodiment described herein.

Although described as operating in a frequency hopping system, it is to be understood that the inventive aspects of the disclosed cordless telephone set are not limited to a cordless telephone set operating in such system, nor is the operation limited to any certain frequency range. For example, the principles of this invention easily may be practiced by well known cordless telephone sets such as AT&T's 5000 series sets which operate over a selected one of 10 channels allocated in the 46–49 MHz frequency band.

Referring once again to FIG. 1, contained in the base unit 10 are a radio communication system including a radio frequency (RF) receiver 110, a RF transmitter 111, a RF power amplifier 112, an antenna 113 and a transmit/receive switch 114. A micro controller 115 provides an interface, via a telephone circuit 124, between the host switch and the radio communication system. The telephone circuit 124 serves as a "plain old telephone service" (POTS) interface for signals received from the host switch and for those signals received from the handset unit 20 by the radio communication system.

The micro controller 115 advantageously provides a number of control functions and may be implemented through the use of a microcomputer containing programmable read-only-memory (PROM), random-access-memory (RAM) and through use of the proper coding. Such a microcomputer is known in the art and is readily available from semiconductor manufacturers such as AMD, Intel, Motorola and Signetics. For example, a microcomputer from Motorola having pan number 68HC05 will provide the desired functions with the proper programming.

Associated with the micro controller 115 is a time division duplexer (TDD) 116 which provides packet assembling and disassembling of speech and data and also error checking for the radio system. Such a time division duplexer also is known and available in the art. For example, a time division duplexer suitable for use as TDD 120 is available from AT&T Microelectronics as part number 1000DD. Data from the micro controller 115 is coupled to the TDD 116 where it is assembled into data packets and then transmitted via the transmitter 111, power amplifier 112, transmit/receive switch 114 and antenna 113 to the handset unit 20. A signal received from the handset unit 20 is coupled via the antenna 113 through the transmit/receive switch 114 to the receiver 110. The receiver 110 demodulates the received signal and couples this signal to the TDD 116 where the received data packets which include voice and/or control information are disassembled and checked for errors. From the TDD 116, the voice and control information is coupled to the micro controller 115.

In order for the base unit 10 to achieve effective coverage throughout its operating range, a received signal strength indicator (RSSI) circuit 117 continually monitors the strength of the received signal from the handset unit 20 during ongoing communications with this handset unit 20. This RSSI circuit 117 produces an output voltage that is proportional to the strength of the received signal from the handset unit 20.

Responsive to the strength of the received signal from the handset unit 20, as determined by the RSSI circuit 117, the micro controller 115 regulates the amount of power transmitted by the RF transmitter 111 and power amplifier 112 to the handset unit 20. Thus when the handset unit 20 is in close proximity to the base unit 10, the level of power radiated by antenna 113 is reduced to a minimum acceptable level. And when the handset unit 20 is determined to be located near the fringe of the telephone's operating range, the level of power radiated by antenna 113 is increased to a selectable maximum level. When only one cordless telephone set is employed in an area (stand-alone configuration), this power is set at the maximum level permitted by regulation. In the stand-alone configuration, the base unit has the capability of dynamically adjusting over, typically, four levels from the lowest level to the highest level in response to the received signal strength from the handset unit 20. By selecting one of these levels, the base unit dynamically adjusts among the four levels, from the minimum level necessary for suitable communications to the maximum permitted level.

When multiple cordless telephones are employed in an area that has multiple base units in close proximity, it may be at times desirable to control the RF power level used between each base unit and its associated handset unit in communicating with each other for the purpose of minimizing the possibility of interference by the base unit with the other base units located in close proximity with this base unit. Thus in a high-density application, such as a strip mall or other location where adjoining businesses all have cordless telephone sets, lower power settings are available and may be used to minimize interference between these cordless telephone sets while also providing the customer with the performance he or she needs. In order to achieve such flexibility, the base unit 10 includes multiple selectable levels, typically four, that may be selected by a user to accommodate operations in such high-density applications. By selecting one of these levels, the base unit can then dynamically adjust between the minimum level necessary for suitable communications and the selected level.

To facilitate operation in a high-density application, a power setting is selected in module 123 to control the power level radiated from the base unit. The control of this power level is determined by positing a switch in the module 123 in one of four positions. The power in the base unit 10 is thus selected to vary dynamically between the minimum needed for suitable communications, as determined by the RSSI circuit 117 in the base unit 10, and the maximum permitted level, as determined by the selected position of the switch in module 123. Information data indicative of the power level being used in the base unit 10 is transmitted over the RF link to the handset unit 20. This power setting is transmitted from the base unit to the handset unit during each initial power-up of the handset unit. The power in handset unit 20 is similarly controlled at the same level as the power in the base unit 10 through use of this data provided by base unit 10 over the RF link. Thus, by way of example, if the base unit 10 is set and operating at half of its maximum power, the control signal provided to the handset unit 20 causes this handset unit to similarly operate at half of its operating power. Such operation is achieved both through dynamically adjusting the power as needed and through selectively limiting the power at the module 123. A conventional DC power supply (not shown) provides operating power for all of the circuitry in the base unit 10.

In accordance with the disclosed embodiment, the base unit provides the test tone to the handset unit 20 for assisting the user of the handset unit in determining a suitable usable operating range between the base unit and the handset unit in diverse geographical locations. In determining the usable operating range, the relative signal link quality between the handset unit 20 and the base unit 10 is examined. To further assist the user in his or her subjective analysis, the test tone simulation is that of a recognizable tone, such as dial tone, for the user to listen to while testing the application environment.

This test tone is provided by a tone source circuit 120 while the cordless telephone is configured in the wireless test mode. The tone source circuit 120 is activated by the micro controller 115 and an analog output signal from this circuit is converted to a digital signal by the analog-to-digital converter 121. This digital signal is coupled from the analog-to-digital converter 121 to TDD 116 for packet assembly and transmission to the handset unit 20.

Each base unit has an assigned ID number depending upon its installed position in a carrier assembly or common housing, such housing being described later herein with reference to FIG. 3. The micro controller uses this base unit ID to determine what position it is plugged into when placed in a carrier assembly or whether it is in a stand-alone configuration. This provides an indication to the user what slot a particular base unit is plugged into in the carrier assembly. Each base unit also has an ID number assignable by the user for identification purposes when it is used in its stand-alone configuration. This ID number is a 4-bit binary number allowing a possible 16 combinations. This number is obtained through the setting of switches in module 122.

Figure 2:
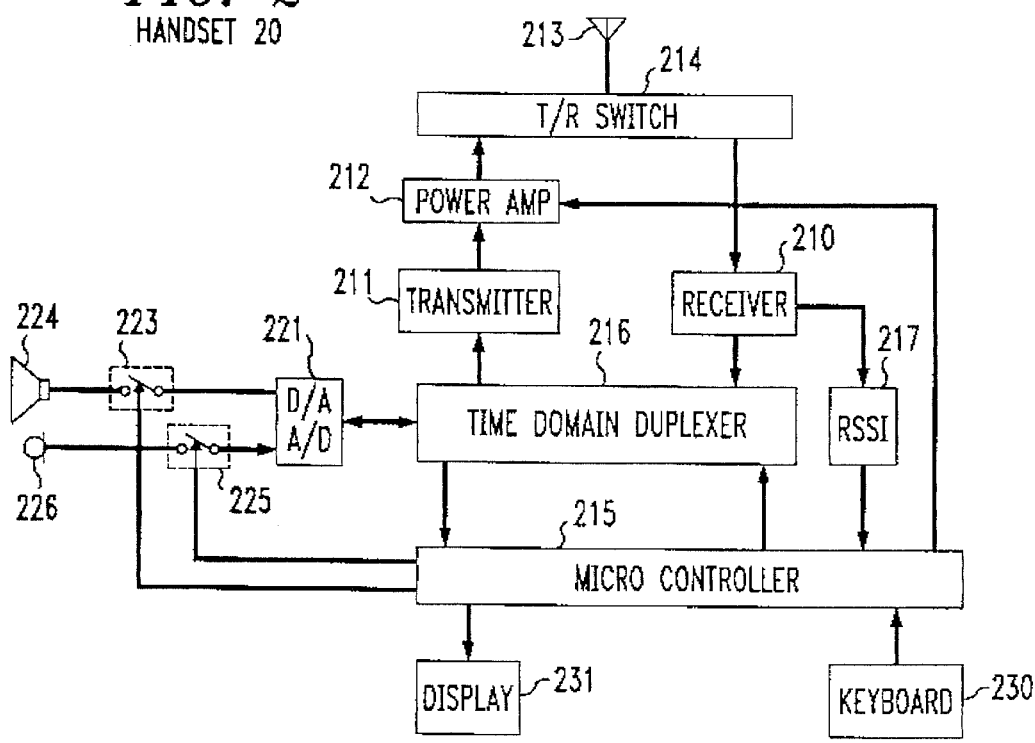
FIG. 2 shows a general block diagram of certain circuitry of a handset unit of a cordless telephone set operative in accordance with the principles of the present invention.

Referring now to FIG. 2 of the drawings, there is shown a general block diagram of certain circuitry of the handset unit 20 of the cordless telephone set. Contained in the handset unit 20 are a radio system comprising a receiver 210, a transmitter 211, a power amplifier 212, an antenna 213 and a transmit/receive switch 214. Similar to micro controller 115, a micro controller 215 provides an interface to the radio system and also to a keyboard 230 and a display 231. The same microcomputer that is usable for micro controller 115 is also usable for micro controller 215 with the proper programming. The micro controller 215 also controls the activation of switches 223 and 225 which respectively couple speech signals to an audio receiver 224 and from an audio transmitter 226 in the handset unit 20.

Associated with the micro controller 215 are a TDD 216 which provides packet assembling and error checking capabilities for the radio system. Operationally identically to TDD 116, this TDD also uses the same time division duplexer. The TDD 216 with its error checking capability determines the integrity of the radio link between the base unit and the handset unit and thus continually determines whether the link should be maintained or terminated. The micro controller 215 also has an ability to access this error information and determine the voice quality of the cordless telephone set. Such operation by the micro controller is described later herein with reference to FIGS. 4 through 6. Data from the micro controller 215 is coupled to the TDD 216 where it is assembled into packets and then transmitted via the transmitter 211, power amplifier 212 and transmit/receive switch 214 over antenna 213 to the base unit 10. A signal received from base unit 10 is coupled via antenna 213 into the transmit/receive switch 214 to the receiver 210. The receiver 210 demodulates the RF signal and converts it into a digital packet. From receiver 210, the signal is coupled to the TDD 216 where the packet is disassembled and checked for errors and the information is coupled to the micro controller 215.

An indication of the strength of the received signal in receiver 210 is obtained from an RSSI circuit 217. This circuit converts the signal strength information to a digital signal which is then coupled into micro controller 215.

When the cordless telephone set is configured in the wireless test mode, the tone source is generated in the base unit in tone source circuit 120 and processed in the base unit 10 as earlier indicated herein. This processed tone source is received by the antenna 213 and coupled via power amplifier 212, receiver 210 and TDD 216 into a digital-to-analog portion of a codec 221. From codec 221, the corresponding analog signal is coupled through a switch 223 to the audio receiver 224 of the handset unit 20. By listening to this audio tone, the user is able to qualitatively determine the link quality between the handset 20 and the base unit 10 as described earlier herein. During normal operation, the switch 223 and a switch 225 are closed to allow voice communications across the radio link between the handset unit 20 and the base unit 10. Switch 225 couples audio signals from a voice transmitter 226 to an analog-to-digital portion of the codec 221.

A keyboard 230 in the handset unit 20 provides for normal digit entry and repertory dialing from the handset unit while the cordless telephone set is in a normal operating mode. When the cordless telephone set is put in the wireless test mode, the user of the handset unit is able to access and evaluate performance levels of operating parameters and features of the cordless telephone set subsequently described later herein with reference to FIGS. 4 through 7. Associated with the keyboard 230 is a display 231 which provides the user with visual feedback for the requested parameters and features. A battery (not shown) provides operating power for all of the circuitry in the handset unit 20. This battery is charged via an interface formed when the handset unit 20 is placed in a mating cradle containing a charging circuit. Such a cradle usable in practicing this invention is described in U.S. Pat. No. 5,371,784 issued on Dec. 6, 1994 and commonly assigned with this invention to the same assignee.

Figure 3:
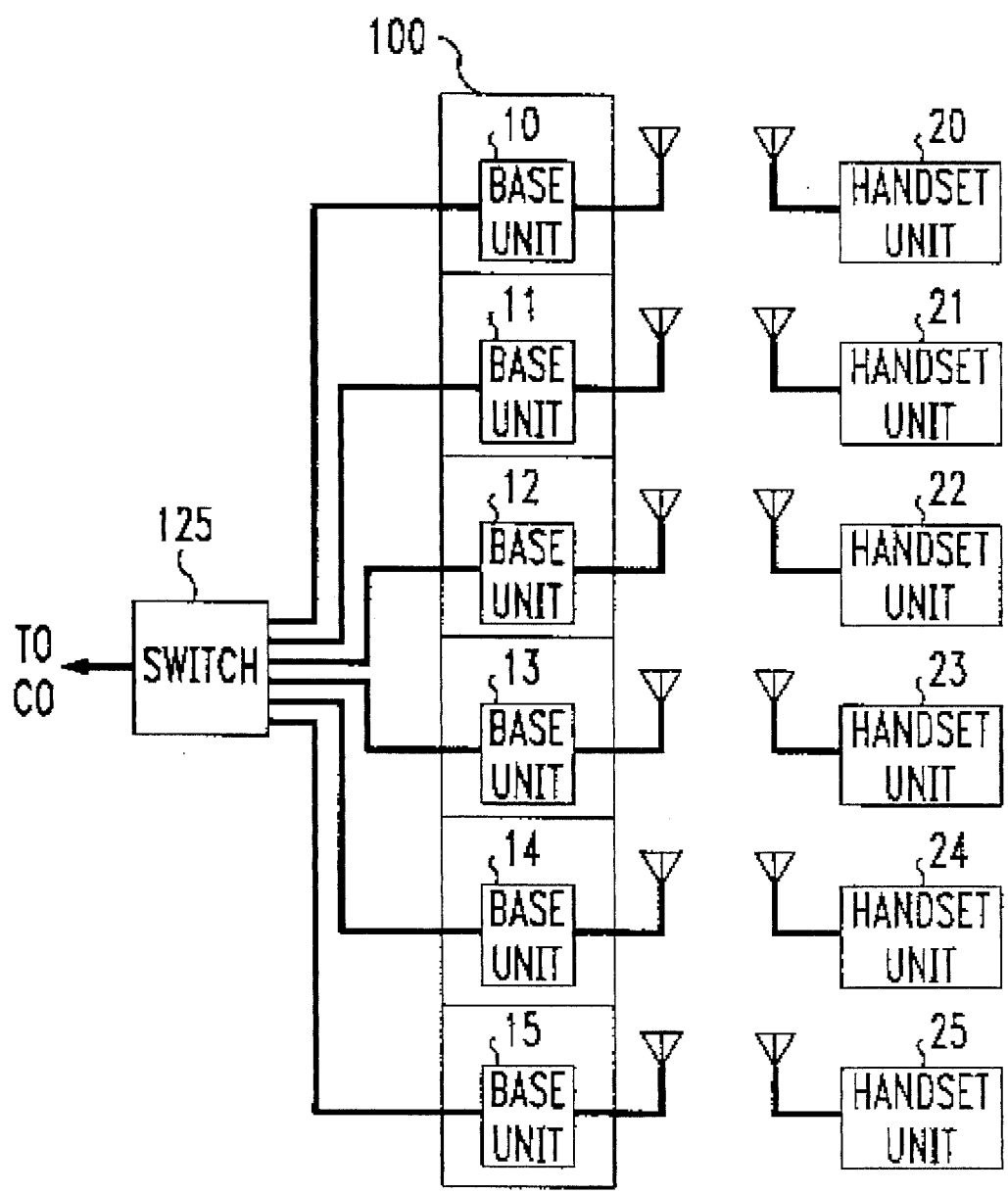
FIG. 3 shows in block representation a plurality of base units and handset units, with the base units being commonly connected to a communication switch.

Referring next to FIG. 3, there is shown a system of cordless telephone sets. Illustratively shown are base units 10 through 15 and handset units 20 through 25. Each of the base units connect via a line circuit to a switch 125 for accessing other of the cordless telephone sets and, via the switch, for accessing the public telephone network or corded telephone sets (not shown) also connected to the switch. Each of the base units also is associated with one of the handset units. For example, base unit 10 is associated with handset unit 20, base unit 11 is associated with handset unit 21, and so forth.

With regard to the functional components illustratively described in base unit 10, in FIG. 1, the base units 11 through 15 incorporate these same components and are operationally identical. Similarly, the handset units 21 through 25 incorporate the same components as handset unit 20, shown in FIG. 2, and are also operationally identical to this handset unit.

The system may comprise one of more of these cordless telephone sets with the base units being located in a common housing 100 at a site location. Such an arrangement of base units is illustratively described in U.S. Pat. No. 4,850,036 which issued to J. W. Smith on Jul. 18, 1989. The required circuitry for these base units may be assembled into circuit module housings as shown in U.S. Pat. Des. 306,576 which issued to J. M. Hiatt et al. on Mar. 13, 1990. These circuit module housings may then be further assembled into the common housing or a circuit module mounting apparatus as shown in U.S. Pat. Des. 306,429 which issued to J. A. Hiatt et al. on Mar. 6, 1990.

Each cordless telephone handset unit, while in the wireless test mode, includes the features earlier described herein. Thus, a user of the plurality of handset units, through use of the wireless test mode, may identify a base unit associated with a particular one of the plurality of handset units for repair purposes or the like. Each one of multiple slots in the circuit module mounting apparatus is given a unique number. While in the wireless test mode, a user may interrogate a handset unit such that the display on the handset unit provides this unique number identifying the slot position of this base unit in the circuit module mounting apparatus. Also, while in the wireless test mode, each cordless telephone handset unit, permits testing for the instantaneous RF power level being used both in the base unit and the handset unit. The display 231 in each handset unit is configurable to show the instantaneous power level that is then being employed by both the base unit and the handset unit in the cordless telephone.

Figure 4:
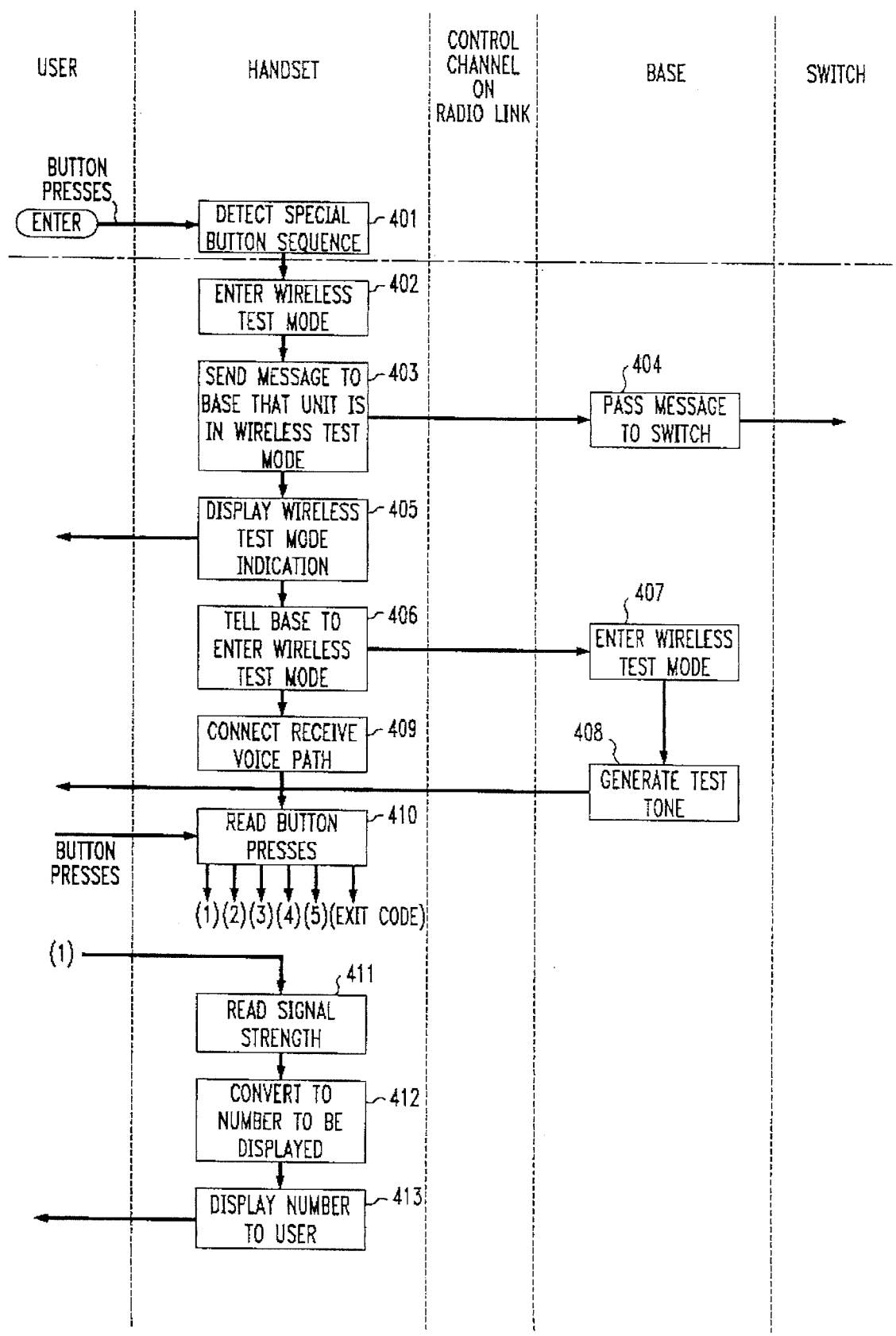
FIGS. 4, 5 and 6 show in flow chart form the protocol of the cordless telephone depicting the specific processes executed by both a handset unit and a base unit for entering a wireless test mode and performing selected functions while in this mode; in accordance with the principles of the present invention.
Figure 5:
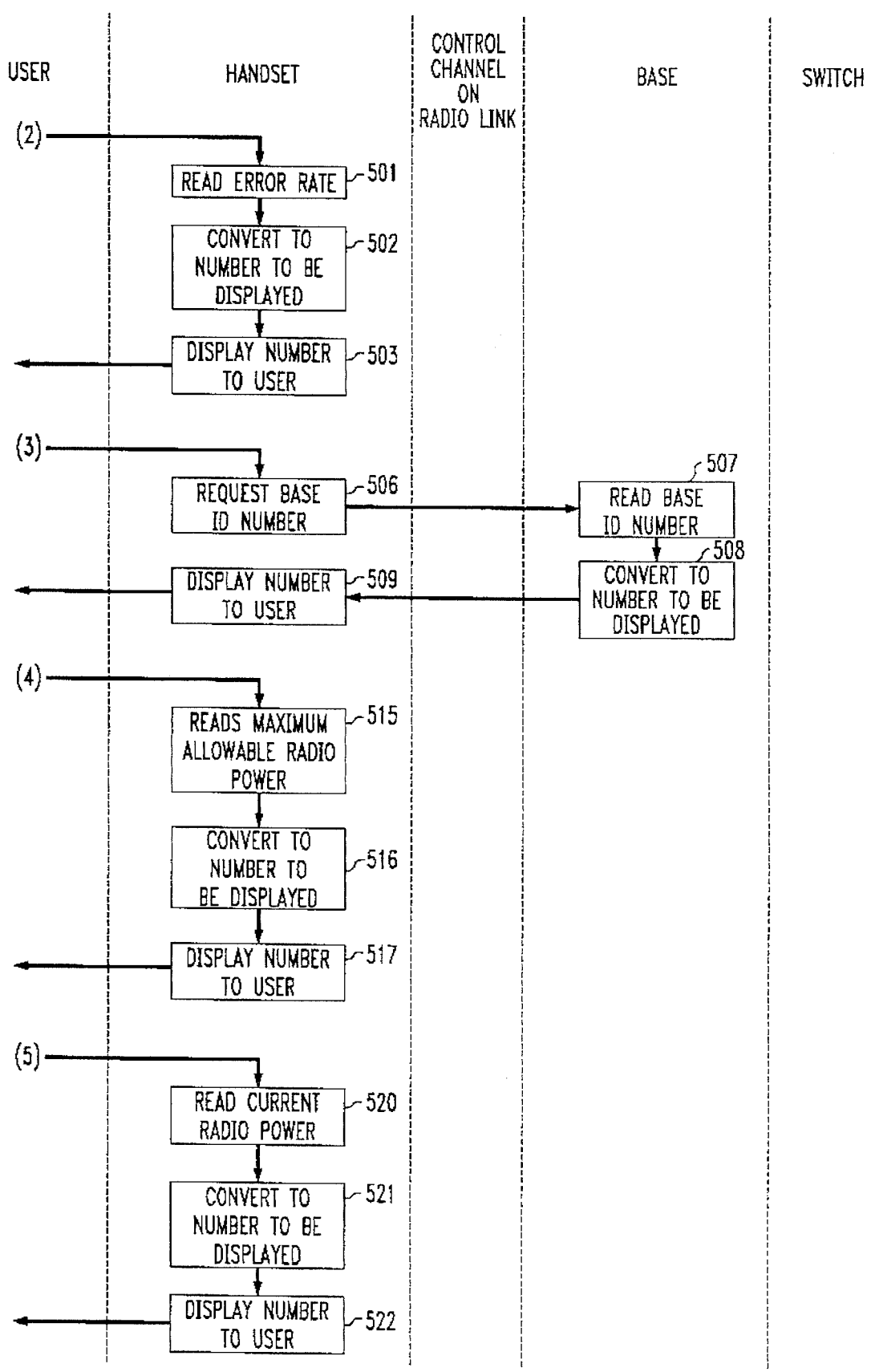
Figure 6:
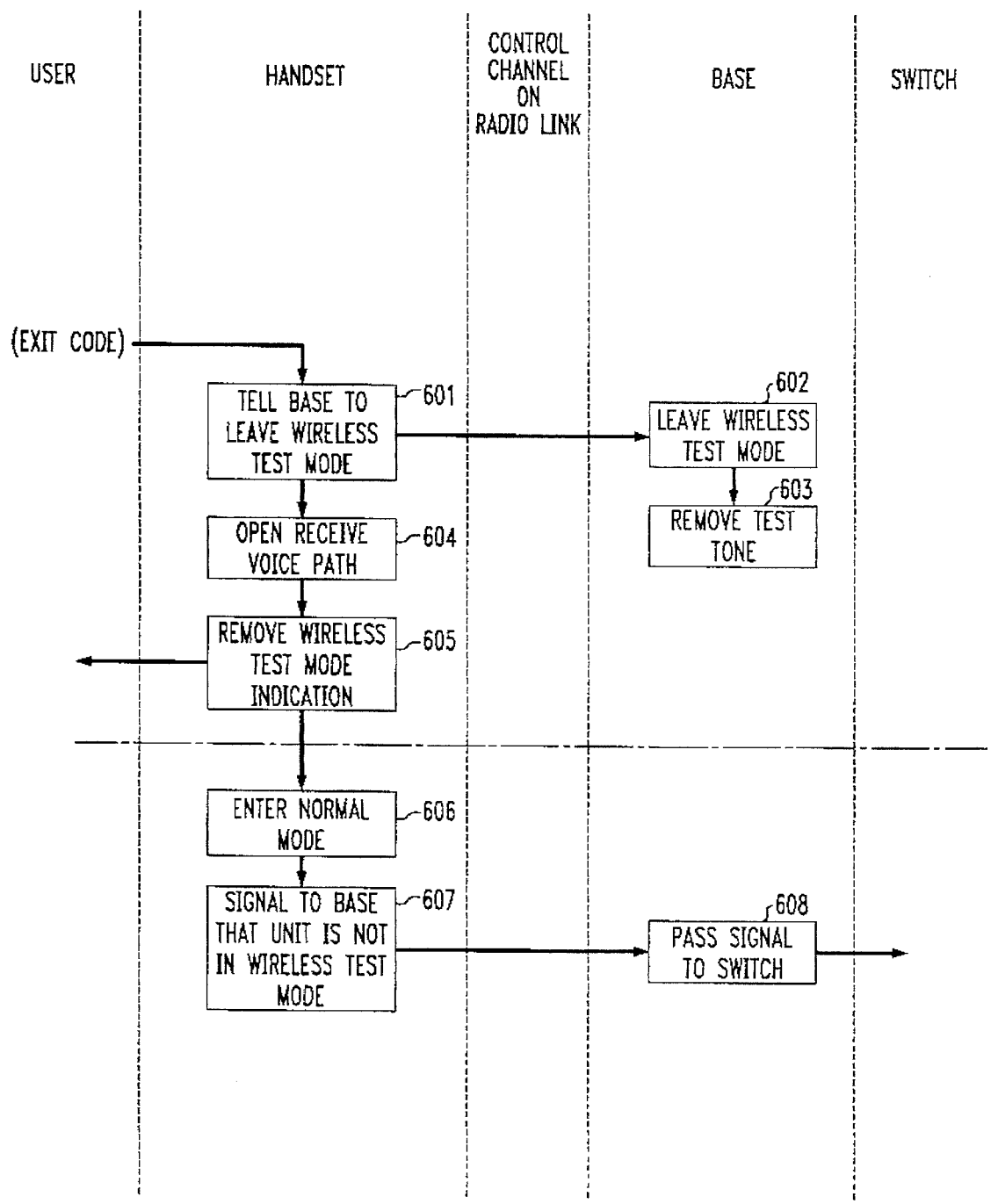

Referring next to FIGS. 4, 5, and 6, in combination, there are shown flow diagrams useful in executing the process of the wireless test mode described earlier herein with reference to FIGS. 1, 2 and 3. The flow diagrams show a protocol describing the interaction between the handset unit and the base unit in entering and executing the features available while both of these units are configured in the wireless test mode. The protocol also shows the input provided by a handset unit user and the feedback provided to this handset unit user in, for example, display 231 of FIG. 2.

The process is entered in step 401, shown in FIG. 4, where the handset unit user performs a special sequence which is detected by the handset unit. One possible button sequence is where the handset unit user presses a button, such as the 9 button, on the keyboard of the handset unit for a minimum of, for example, 3 seconds. While holding the 9 button down, the user also momentarily presses the ON-OFF button which causes the handset unit to enter into the wireless test mode, as depicted by step 402. A message that the handset unit has entered the wireless test mode is generated and transmitted to the base unit in step 403. The base unit, in turn, passes this message to the host switch in step 404, if such a switch is connected, informing the switch that the handset unit and base unit are both in the wireless test mode. To perform this testing while in this mode, the base unit does not need to be connected to the switch, but rather generates all signals locally that are provided to the handset unit.

From step 403, the process in the handset unit advances to step 405 where an indication is displayed to the user of the handset unit that the handset unit has entered the wireless test mode. Such an indication may be, for example, a T in the upper right section of the display of the handset unit and the word "ON" in the lower left section of this display. The T represents that the handset unit has entered the wireless test mode and the "ON" represents that the handset unit has been turned on. In step 406, the handset unit instructs the base unit to enter the wireless test mode and the base unit responds by entering this mode in step 407. At step 408, the base unit generates and sends over the radio link then existing between it and the handset unit the test tone which is heard in the audio receiver by the user of the handset unit. This is made possible through execution of step 409 in the handset unit which connects the receive voice path in the handset unit allowing the user to hear the test tone generated in the base unit.

At this point in the process, the user is presented with a prompt on the handset unit display to make one of a plurality of possible button depressions, illustratively, buttons 1 through 5 in order to observe performance levels of operating parameters in the handset unit display or obtain selected other available information about the handset unit and base unit. The handset unit detects when one of these buttons is depressed in step 410. An exit code is also available to the user at any time should he or she wish to exit the process. Exiting the process is achieved simply by pressing the ON-OFF button on the handset unit.

When button number 1 is depressed, the handset unit executes step 411 by reading the signal strength information stored in its RSSI circuit. This information is converted in step 412 to a relative number between 1 and 10 that is indicative of the received signal strength. This range of numbers and the representative signal strength for each number are shown in FIG. 7. In step 413, the number assigned to the signal strength signal is displayed in the display of the handset unit for viewing by the user.

When button number 2 is depressed, as shown in step 501 of FIG. 5, the bit error rate (voice quality) available in the TDD of the handset unit is read. The bit error rate corresponds to voice quality such that when the bit error rate is high, voice quality is low, and when the bit error rate is low, voice quality is high. This bit error rate is converted in step 502 to a relative number between 1 and 10 that is indicative of the bit error rate. This range of numbers and the representative voice quality for each number are shown in FIG. 7. In step 503, the number assigned to the bit error rate is displayed in the display of the handset unit for viewing by the user.

When button number 3 is depressed, the handset unit at step 506 requests from its assigned base unit the identification (ID) number associated with that base unit. The base unit, in turn, reads the base unit ID number at step 507, and converts this ID number to a number for displaying on the handset unit at step 508. The number associated with the assigned base unit is then displayed to the user by the handset unit in step 509. This number typically has a value of between 1 and 6 and is indicative of the position of the base unit in a circuit module mounting apparatus. Thus, a user is able to easily go to and examine the correct base unit in the module mounting apparatus when a problem with the operation of this base unit is suspected.

When button number 4 is depressed, the handset unit, at step 515, reads the maximum RF power then permitted by the position of the power setting switch in the base unit. As previously described herein, this power setting is transmitted from the base unit to the handset unit during the initial power-up of the handset unit. The handset unit in step 516 converts the allowable radio power to a number to be displayed and then displays this number to the user in step 517.

When button number 5 is depressed, the handset unit, at step 520, reads the instantaneous, dynamically-adjusted RF power setting. The handset unit, in step 521, converts this power setting to a number indicative of the current RF power setting. This number is then displayed in the display of the handset unit at step 522 for viewing by the user of the handset unit.

When the ON-OFF button (exit code) is depressed, the handset unit instructs the base unit to exit the wireless test mode at step 601, in FIG. 6, and the base unit at step 602 exits the wireless test mode and stops sending the simulated test tone at step 603. Once the handset unit has instructed the base unit to exit the wireless test mode, the handset unit opens the receive voice path at step 604. From step 604, the process advances to step 605 where the handset unit removes the wireless test mode indicators in its display. At step 606, the handset unit enters its normal operating mode of operation and, at step 607, signals to the base unit that the handset unit has also exited the wireless test mode. The base unit then passes a signal to the switch in step 608 for indicating that the handset unit is no longer in the wireless test mode.

Various other modifications of this invention are contemplated and may obviously be resorted to by those skilled in the art. One example of such a modification would be to reconfigure the operation and reverse the roles of the handset unit and the base unit described herein. Inasmuch as the handset unit and the base unit are both radio devices and employ similar components including the same microcomputer, it should be understood that the functionality that is incorporated in the handset unit also may be incorporated into the base unit. Similarly, the functionality described in the base unit also may be incorporated into the handset unit.

Another example of such a modification would be to expand the level of the functionality contained in both the handset unit and the base unit, as well as access the computing power contained in the host switch for providing selectable privileges or features that may be associated with a particular cordless telephone set. As cordless telephone sets become more commonplace in all environments, home, office or business facilities in general, for example, it will at some point become desirable to be able to identify a specific cordless telephone handset unit which not only interacts with a particular base unit, but also belonging to or is assignable to a particular individual. Thus the modification of the disclosed invention that is readily implementable in accordance with the principles disclosed herein is the inclusion of a special button sequence which provides user identifying information on the display of the handset unit. This user identifying information could be, for example, the name of the user or any other information the user has previously chosen to input into the handset unit.

The user provides the identifying information through the keyboard 230, shown in FIG. 2 after configuring the cordless telephone by an easily selectable button sequence to receive this identifying information in the programmable memory of the micro controller 115. The identifying information may be alphanumeric information inputted to the handset unit in accordance with the teachings of U.S. Pat. Nos. 3,675,513, 3,967,273 and 4,633,041. Once this identifying information is in memory, the user may then readily identify which one of multiple handset units belong to him or her.

Such a cordless telephone handset unit may also have particular assignable privileges or features. Cordless telephones may one day find common use in, for example, airports and restaurants and other facilities where use of a temporary personal telephone is desirable. A person may be able to select one from a number of cordless telephones having different assignable privileges or features. Such privileges or features could be, by way of example, the ability to make and/or receive telephone calls, make calls to selectable geographical locations (national or international), or even purchase a predetermined amount of credit against which telephone calls may be billed. Each of these privileges and features may be managed at the host switch by providing the proper coding for this switch. The provider of the service may thus easily program identifying information into each telephone handset unit for identifying which privileges or features are being provided to a purchaser of the handset unit for temporary personal use. By viewing the identifying information provided in the display before issuing the handset unit, the provider is assured that the handset unit being issued provides the service purchased by the customer. Thus it is apparent that other modifications of this invention are possible without departing from the spirit and scope of the invention as hereinafter defined by the appended claims.

We claim:

1. A cordless telephone comprising:

A handset unit and a base unit;

circuit means for configuring both the handset unit and the base unit in a first operating mode for providing wireless telephone communications between said handset unit and said base unit, and in a second operating mode for testing said wireless telephone communications between the handset unit and the base unit;

control means for selectably configuring said circuit means for operation of the handset unit and base unit in either said first operating mode or said second operating mode; and means for generating a test signal and providing said test signal in said wireless telephone communications between the handset unit and the base unit while said units are configured in the second operating mode, said handset unit and base unit being further configured while in said second operating mode for obtaining signal parameters from said test signal for testing said wireless telephone communications, said signal parameters determining the quality of signal communications between said handset unit and said base unit.

2. The cordless telephone as in claim 1 wherein said test signal includes an audible tone generated on a communication channel.

3. The cordless telephone as in claim 1 wherein said signal parameters include statistical indications of both a received signal strength and a voice quality of said test signal.

4. The cordless telephone as in claim 3 wherein said signal parameters further include an audible indication of the quality of said test signal.

5. The cordless telephone as in claim 1 wherein the test signal is generated by the base unit and received by the handset unit while operating in the second operating mode.

6. The cordless telephone as in claim 4 further including means for transmitting the test signal over a communication channel.

7. The cordless telephone as in claim 4 further including means for transmitting the test signal over a plurality of communication channels.

8. The cordless telephone as in claim 1 wherein said wireless telephone communications include establishing a radio link between said handset unit and said base unit for transmitting and receiving audio information and data between said handset unit and said base unit.

9. The cordless telephone as in claim 7 arranged for operating in a frequency hopping system, said plurality of communication channels being generated in the frequency hopping system.

10. The cordless telephone as in claim 1 wherein the control means includes keyboard entry means for entering predetermined codes for configuring said circuit means, entering a first predetermined code configuring the circuit means for operation of the handset unit and base unit in the first operating mode and entering a second predetermined code configuring the circuit means for operation of the handset unit and base unit in the second operating mode.

11. The cordless telephone as in claim 10 wherein the control means further includes selectable predetermined codes for accessing selected information contained in memory within the cordless telephone, said information being available while the handset unit and the base unit are both configured in the second operating mode.

12. In a cordless telephone, a handset unit for providing communications with a base unit, the handset unit comprising:

circuit means for configuring the handset unit in a first operating mode for providing wireless telephone communications between said handset unit and said base unit, and in a second operating mode for testing said wireless telephone communications between the handset unit and the base unit;

control means for selectably configuring said circuit means for operation of the handset unit in either said first operating mode or said second operating mode; and means for receiving a test signal provided in said wireless telephone communications from the base unit to the handset unit while said handset unit is configured in the second operating mode, said handset unit being further configured while in said second operating mode for obtaining signal parameters from said test signal for testing said wireless telephone communications, said signal parameters determining the quality of signal communications between said handset unit and said base unit.

13. The handset unit as in claim 12 wherein the test signal is received over a communication channel.

14. The handset unit as in claim 12 wherein the test signal is received over a plurality of communication channels.

15. The handset unit as in claim 14 arranged for operating in a frequency hopping system, said plurality of communication channels being generated in the frequency hopping system.

16. The handset unit as in claim 12 wherein the control means includes keyboard entry means for entering predetermined codes for configuring said circuit means, entering a first predetermined code configuring the circuit means for operation of the handset unit in the first operating mode and entering a second predetermined code configuring the circuit means for operation of the handset unit in the second operating mode.

17. The handset unit as in claim 16 wherein the control means further includes selectable predetermined codes for accessing selected information stored in memory contained within the handset unit, said information being available while the handset unit is configured in the second operating mode.

18. In a cordless telephone, a base unit for providing communications with a handset unit, the base unit comprising:

circuit means for configuring the base unit in a first operating mode for providing wireless telephone communications between said base unit and said handset unit, and in a second operating mode for testing said wireless telephone communications between the base unit and the handset unit;

control means for selectably configuring said circuit means for operation of the base unit in either said first operating mode or said second operating mode; and means for generating a test signal and providing said test signal in said wireless telephone communications between the handset unit and the base unit while said base unit is configured in the second operating mode, said base unit being further configured while in said second operating mode for obtaining signal parameters from said test signal for testing said wireless telephone communications, said signal parameters determining the quality of signal communications between said handset unit and said base unit.

19. The base unit as in claim 18 wherein said signal parameters include statistical indications of both a received signal strength and a voice quality of said test signal.

20. The base unit as in claim 18 further including means for transmitting the test signal over a communication channel.

21. The base unit as in claim 19 further including means for transmitting the test signal over a plurality of communication channels.

22. The base unit as in claim 21 arranged for operating in a frequency hopping system, said plurality of communication channels being generated in the frequency hopping system.

23. The base unit as in claim 18 wherein the control means includes keyboard entry means for entering predetermined codes for configuring said circuit means, entering a first predetermined code configuring the circuit means for operation of the base unit in the first operating mode and entering a second predetermined code configuring the circuit means for operation of the base unit in the second operating mode.

24. The base unit as in claim 23 wherein the control means further includes selectable predetermined codes for accessing selected information contained in memory within the base unit, said information being available while the base unit is configured in the second operating mode.

25. A cordless telephone system comprising:

A handset unit and a base unit;
    circuit means in said handset unit for configuring both the handset unit and the base unit in a first operating mode and a second operating mode, while in said first operating mode, said handset unit and said base unit are configured for providing wireless telephone communications with each other and, while in said second operating mode, said handset unit and base unit are configured for testing said wireless telephone communications;
    control means in said handset unit for selectably configuring said circuit means for operation of the handset unit and base unit in either said first operating mode or said second operating mode; and
    means in said base unit for generating a test signal and providing said test signal in said wireless telephone communications between the handset unit and the base unit while said units are configured in the second operating mode, said handset unit and base unit being further configured while in said second operating mode for obtaining signal parameters from said test signal for testing said wireless telephone communications, said signal parameters determining the quality of signal communications between said handset unit and said base unit.

26. A method of communicating between a base unit and a handset unit in a cordless telephone, the method comprising the steps of;
    configuring both the handset unit and the base unit in a first operating mode for providing wireless telephone communications between said handset unit and said base unit, and in a second operating mode for testing said wireless telephone communications between the handset unit and the base unit;
    selectably operating the handset unit and base unit in either said first operating mode or said second operating mode responsive to said configuring step;
    generating a test signal for testing said wireless telephone communications while said handset unit and base unit are configured in the second operating mode;
    providing said test signal in said wireless telephone communications between the handset unit and the base unit while said units are configured in the second operating mode; and
    further configuring said base unit and said handset unit while in said second operating mode for obtaining signal parameters from said test signal for testing said wireless telephone communications, said signal parameters determining the quality of signal communications between the handset unit and the base unit.

27. The method of claim 26 wherein the test signal is generated by the base unit and received by the handset unit while operating in the second operating mode.

28. The method of claim 26 further including the step of entering predetermined codes for configuring said handset unit and said base unit, entering a first predetermined code configuring the handset unit and base unit in the first operating mode and entering a second predetermined code configuring the handset unit and base unit in the second operating mode.

29. The method of claim 28 wherein the predetermined codes further includes selectable predetermined codes for accessing selected information contained in memory within the cordless telephone, said information being available while the handset unit and the base unit are both configured in the second operating mode.

* * * * *